United States Patent
Song et al.

(10) Patent No.: US 9,139,083 B2
(45) Date of Patent: Sep. 22, 2015

(54) LPG BOMB APPARATUS

(71) Applicants: Hyundai Motor Company, Seoul (KR); Kia Motors Corporation, Seoul (KR)

(72) Inventors: Ju Tae Song, Gyeonggi-do (KR); Cheol Hun Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 13/828,997

(22) Filed: Mar. 14, 2013

(65) Prior Publication Data

US 2014/0174571 A1    Jun. 26, 2014

(30) Foreign Application Priority Data

Dec. 26, 2012  (KR) .................. 10-2012-0153735

(51) Int. Cl.
*B60K 15/03* (2006.01)
*F17C 7/04* (2006.01)

(52) U.S. Cl.
CPC ........... *B60K 15/03* (2013.01); *B60K 15/03006* (2013.01); *F17C 7/04* (2013.01);
(Continued)

(58) Field of Classification Search
CPC ............ B60K 15/03; B60K 15/03006; B60K 2015/03026; B60K 2015/03019; F04B 15/06; F04B 15/08; F04B 2015/081; F04B 23/04; F04B 23/08; F04B 41/02; F04B 41/06; F04B 49/007; F04B 49/24; F04B 2205/01; F04B 2205/05; F04B 2205/06; F04B 2205/063; F04B 2205/064; F04B 2205/065; F02M 21/0218; F02M 21/0221; F02M 21/0224; F02M 21/023; F02M 21/0242; F02M 21/0287; F17C 13/04; F17C 2205/0323; F17C 2205/0332; F17C 2205/0335; F17C 2205/0338

USPC ............. 137/565.17, 583, 588, 589, 512; 417/244, 250, 251, 252, 253, 286, 300, 417/307; 62/45.1; 123/27, 525–259

See application file for complete search history.

(56) References Cited

U.S. PATENT DOCUMENTS 1,798,943 A  *  3/1931  Hunt ............................... 70/242
2,550,886 A  *  5/1951  Thompson ..................... 62/48.2
(Continued)

FOREIGN PATENT DOCUMENTS

JP    2006-299874 A    11/2006
JP    2006299874    *    11/2006
(Continued)

OTHER PUBLICATIONS

Raw Machine Translation of KR1020120035959A ("Motonic" Pub. Apr. 17, 2012).*
(Continued)

*Primary Examiner* — Craig Schneider
*Assistant Examiner* — David Colon Morales
(74) *Attorney, Agent, or Firm* — Mintz Levin Cohn Ferris Glovsky and Popeo, P.C.; Peter F. Corless

(57) ABSTRACT

An LPG bomb apparatus is provided, including: a fuel charging unit formed on a LPG bomb; a fuel conduit through which fuel flows from the fuel charging unit to a fuel pump; a first check valve that is formed on the fuel conduit inside the LPG bomb and sucks the fuel with a pressure of the fuel pump; and a second check valve that is formed on the fuel conduit inside the LPG bomb, is spaced apart from the first check valve, and discharges the fuel to be charged by the fuel charging unit to the LPG bomb.

11 Claims, 8 Drawing Sheets

(52) U.S. Cl.
CPC .............. *B60K2015/03019* (2013.01); *B60K 2015/03026* (2013.01); *F17C 2201/056* (2013.01); *F17C 2201/058* (2013.01); *F17C 2205/0335* (2013.01); *F17C 2221/035* (2013.01); *F17C 2223/0153* (2013.01); *F17C 2223/033* (2013.01); *F17C 2223/047* (2013.01); *F17C 2225/045* (2013.01); *F17C 2225/047* (2013.01); *F17C 2250/0413* (2013.01); *F17C 2250/0626* (2013.01); *F17C 2265/066* (2013.01); *F17C 2270/0168* (2013.01); *Y10T 137/86035* (2015.04)

(56) References Cited

U.S. PATENT DOCUMENTS

| | | | | | |
|---|---|---|---|---|---|
| 3,220,393 | A | * | 11/1965 | Schlink | 123/527 |
| 4,423,750 | A | * | 1/1984 | Morizumi et al. | 137/413 |
| 4,499,916 | A | * | 2/1985 | Hanson et al. | 137/103 |
| 4,730,652 | A | * | 3/1988 | Bartholomew | 141/302 |
| 5,127,230 | A | * | 7/1992 | Neeser et al. | 62/7 |
| 5,474,104 | A | * | 12/1995 | Borland et al. | 137/381 |
| 5,507,318 | A | * | 4/1996 | Israelson | 137/854 |
| 5,623,907 | A | * | 4/1997 | Cotton et al. | 123/456 |
| 5,967,126 | A | * | 10/1999 | Ofner | 123/525 |
| 6,003,499 | A | * | 12/1999 | Devall et al. | 123/520 |
| 6,016,834 | A | * | 1/2000 | Leidl | 137/571 |
| 6,314,947 | B1 | * | 11/2001 | Roche | 123/525 |
| 7,284,540 | B2 | * | 10/2007 | Attwood et al. | 123/509 |
| 2002/0014227 | A1 | * | 2/2002 | Girouard | 123/527 |
| 2004/0129256 | A1 | * | 7/2004 | Kim | 123/514 |
| 2005/0263186 | A1 | * | 12/2005 | Ricco et al. | 137/392 |
| 2006/0042606 | A1 | * | 3/2006 | Van Dyke | 123/527 |
| 2008/0029519 | A1 | * | 2/2008 | Sommer et al. | 220/562 |
| 2008/0134693 | A1 | * | 6/2008 | Harper et al. | 62/50.7 |
| 2009/0301443 | A1 | * | 12/2009 | Kojima et al. | 123/513 |
| 2010/0213702 | A1 | * | 8/2010 | Ishii | 285/33 |
| 2012/0060935 | A1 | * | 3/2012 | Carter et al. | 137/14 |

FOREIGN PATENT DOCUMENTS

| | | |
|---|---|---|
| KR | 10-2005-0003081 A | 1/2005 |
| KR | 10-2010-0097570 | 9/2010 |
| KR | 10-2010-0097570 A | 9/2010 |
| KR | 10-2012-0003595 A | 1/2012 |
| KR | 1020120035959 A * | 4/2012 |
| KR | 10-2012-0105638 A | 9/2012 |
| WO | 03/029719 A1 | 4/2003 |
| WO | WO03029719 A1 * | 4/2003 |

OTHER PUBLICATIONS

Raw Machine Translation of JP2006299874 ("Nikki" Pub. Feb. 11, 2006).*

* cited by examiner

LPG BOMB APPARATUS

CROSS-REFERENCE TO RELATED APPLICATION

This application claims under 35 U.S.C. §119(a) the benefit of Korean Patent Application No. 10-2012-0153735 filed Dec. 26, 2012, the entire contents of which are incorporated herein by reference.

BACKGROUND (a) Technical Field

The present disclosure relates to a fuel tank of a vehicle using LPG (Liquefied Petroleum Gas) as a fuel. More particularly, it relates to a LPG bomb apparatus capable of maintaining a constant pressure therein.

(b) Description of the Related Art

In existing LPG vehicles using LPG as a fuel, the LPG is evaporated and then supplied to the engines of the vehicles. However, a LPI (Liquefied Petroleum Injection) arrangement in which LPG is directly injected as a high-pressure liquid-phase by an injector has been mainly used in order to solve a problem such as a poor start-up during cold weather, for example, in winter time.

In a conventional arrangement, a fuel pump may lose its suction capability due to cavitations generated when temperature, pressure or composition of fuel within the LPG bomb are varied abruptly in the course of recharging LPG.

In a related art, Korean Application No. 10-2010-0097570, in order to solve the above-mentioned problem, discloses that a fuel is charged through a liquid-phase outlet formed on the front end of a charging pipe and a gas-phase outlet formed on an upper part of the charging pipe concurrently to maintain constantly a gas-phase side pressure in the LPG bomb and to prevent a charge delaying phenomenon caused by a pressure increase in the gas phase side.

FIG. 1 is a view showing a LPG bomb apparatus according to the related art in which a part of fuel injected through a fuel charging unit 30 is evaporated and is charged to a gas-phase side V, and another part of fuel is charged to a liquid-phase side L via a liquid-phase charging pipe 51. The fuel in the liquid-phase side L is sucked by a fuel pump 20.

FIG. 2 is a view showing a LPG bomb apparatus according to a related art in which a first check valve 70 and a second check valve 90 are formed on a charging conduit 33 of a LPG bomb 10 and suck fuel to a fuel pump. The first check valve 70 is formed on the front side of a suction conduit and the second check valve 90 is formed on a side of a fuel motor 20.

Generally there is no problem in vehicles that are fully charged and then restarted after automatically cutting-off the charging, while a pressure in a LPG bomb is increased again after the pressure in the LPG bomb was decreased. However, in cases in which the vehicles are charged frequently with small quantities of LPG and driven at low speeds repeatedly to increase temperature in the LPG bomb, start-up of the vehicles may be impossible if it is attempted to re-start the vehicles at the moment when the pressure in the LPG bomb is decreased during charging.

Due to this, the pressure before start-up of the vehicle is maintained even though the pressure in the LPG bomb is decreased by a check valve used in an ordinary suction pipe conduit during charging, and after start-up, heat remains in the fuel pump to form high pressure in the suction pipe conduit when compared with the LPG bomb.

Therefore, when trying to restart the vehicles after charging, it is impossible to restart the vehicles because the pressure in the LPG bomb is formed lower than the pressure in the suction pipe conduit and thus the fuel within the LPG bomb is not inflowed smoothly into the suction pipe.

Thus, there is a need for an apparatus which can improve poor start-up performance after charging even when a vehicle is frequently charged with LPG by small quantities of fuel and is restarted after charging, by allowing a fuel temperature in a LPG bomb preferably to be maintained, and thus not decreased.

The disclosure in the background art is only to assist to understand of the background of the present invention, but it is not understood that the disclosure is a prior art known to those skilled in the art.

SUMMARY

The present invention has been made in an effort to solve the above-described problems associated with the related art. An object of the present invention is to provide a LPG bomb apparatus, capable of improving a poor start-up performance after charging even when a vehicle is frequently charged with LPG by small quantities of fuel and is restarted after charging, by allowing a fuel temperature in a LPG bomb not to be decreased.

In order to achieve the above object, the LPG bomb apparatus according to the present invention may include: a fuel charging unit formed on a LPG bomb; a fuel conduit through which fuel flows from the charging unit to a fuel pump; a first check valve that is formed on the fuel conduit inside the LPG bomb and sucks the fuel with a pressure of the fuel pump; and a second check valve that is formed on the fuel conduit inside the LPG bomb, is spaced apart from the first check valve, and discharges the fuel to be charged by the fuel charging unit to the LPG bomb.

The fuel conduit may include: a liquid-phase charging pipe an upper end of which is connected to the fuel charging unit and a lower end of which is extended to a bottom of the LPG bomb; and a suction conduit that is connected to the liquid-phase charging pipe and transports the sucked fuel to the fuel pump.

The liquid-phase charging pipe may be made of a flexible material.

The liquid-phase charging pipe may be a plastic tube.

The first check valve and the second check valve may be formed on the suction conduit.

The first check valve and the second check valve may be formed on a downstream side of the suction conduit.

An injection hole preferably is formed on the upper end of the fuel conduit to evaporate a part of the fuel in accordance with a ratio determined when charging the fuel and to inject the evaporated fuel to a gas-phase side V of the LPG bomb.

The first check valve may have an umbrella shape, and a fuel suction capability thereof may be not affected by the pressure that opens the valve.

The first check valve may be opened while a vehicle drives and the fuel inflows into the fuel pump therethrough.

The second check valve may be opened to charge a liquid-phase side L of the LPG bomb with the fuel when a pressure generated in the fuel conduit is a set pressure or more when charging the fuel.

A quick connector may be formed on the upper end of the fuel conduit to facilitate the assembling of the fuel conduit and the fuel charging unit.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
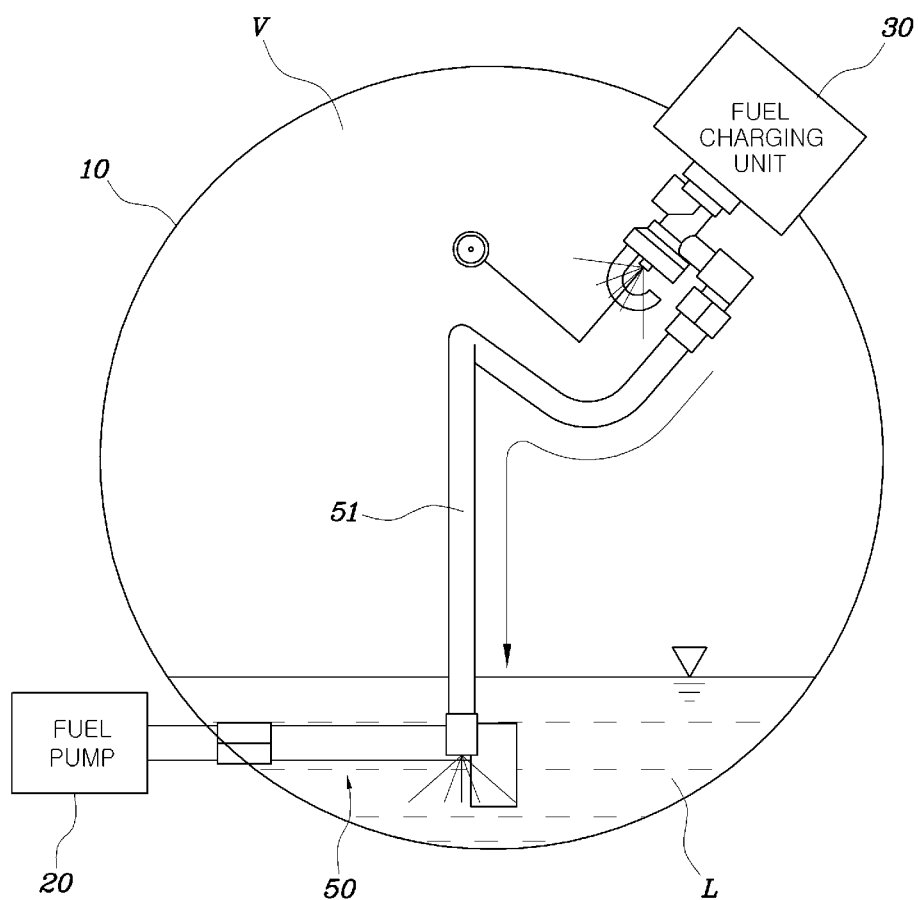
FIG. 1 (RELATED ART) is a view showing a LPG bomb apparatus according to a related art.
Figure 2:
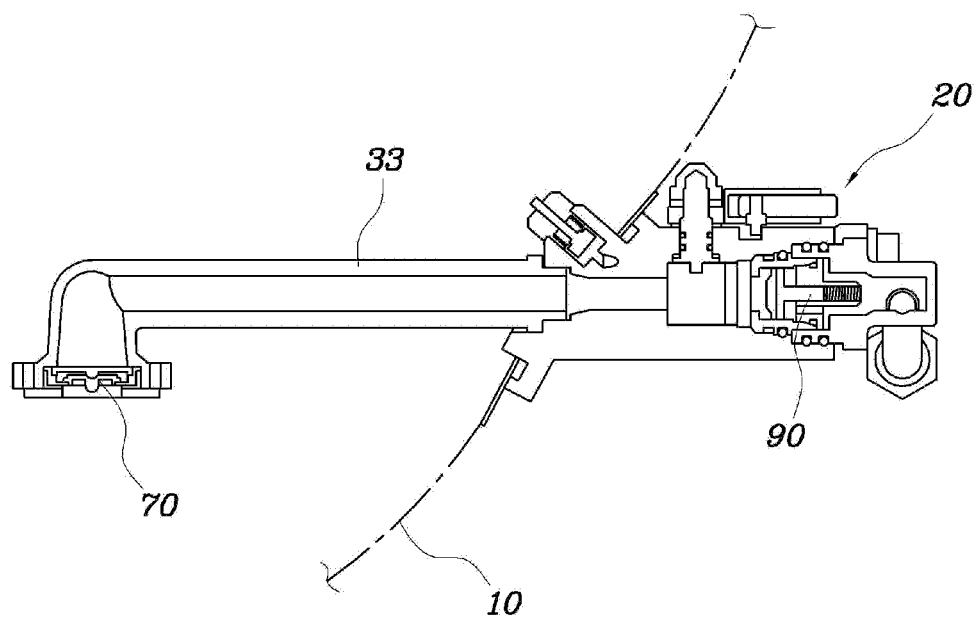
FIG. 2 (RELATED ART) is a view showing in detail a suction conduit of a LPG bomb apparatus according to a related art.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below.

Figure 3:
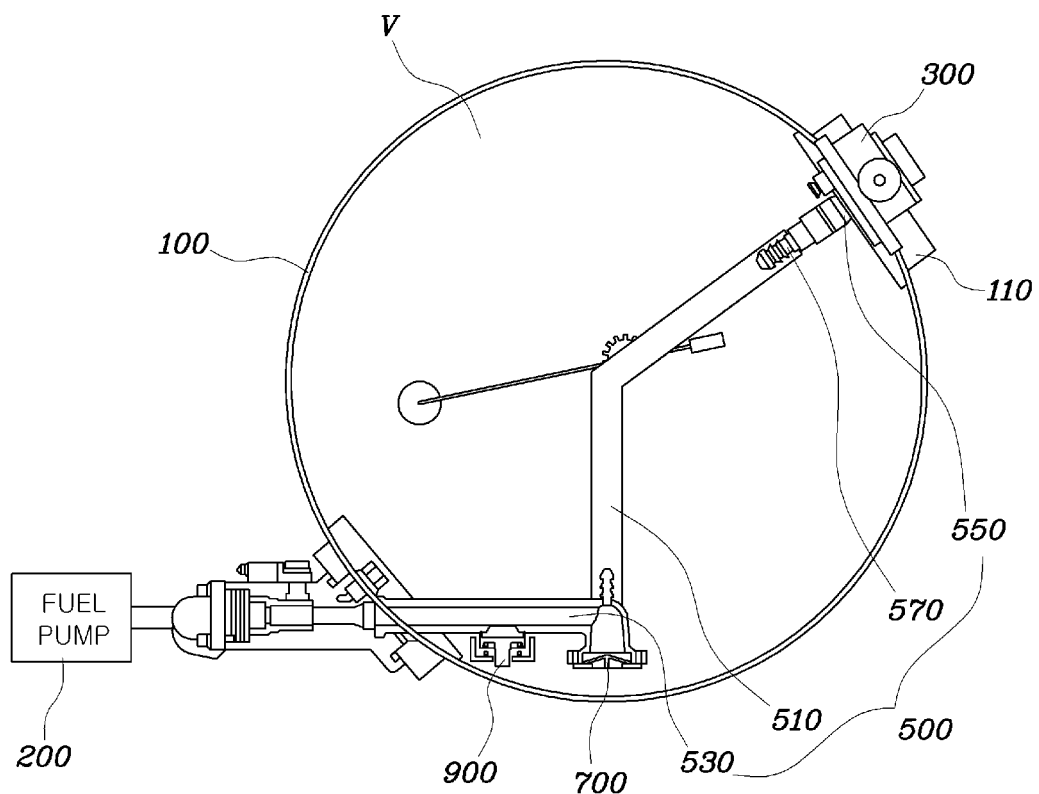
FIG. 3 is a view showing a LPG bomb apparatus in accordance with one embodiment of the present invention.
Figure 4:
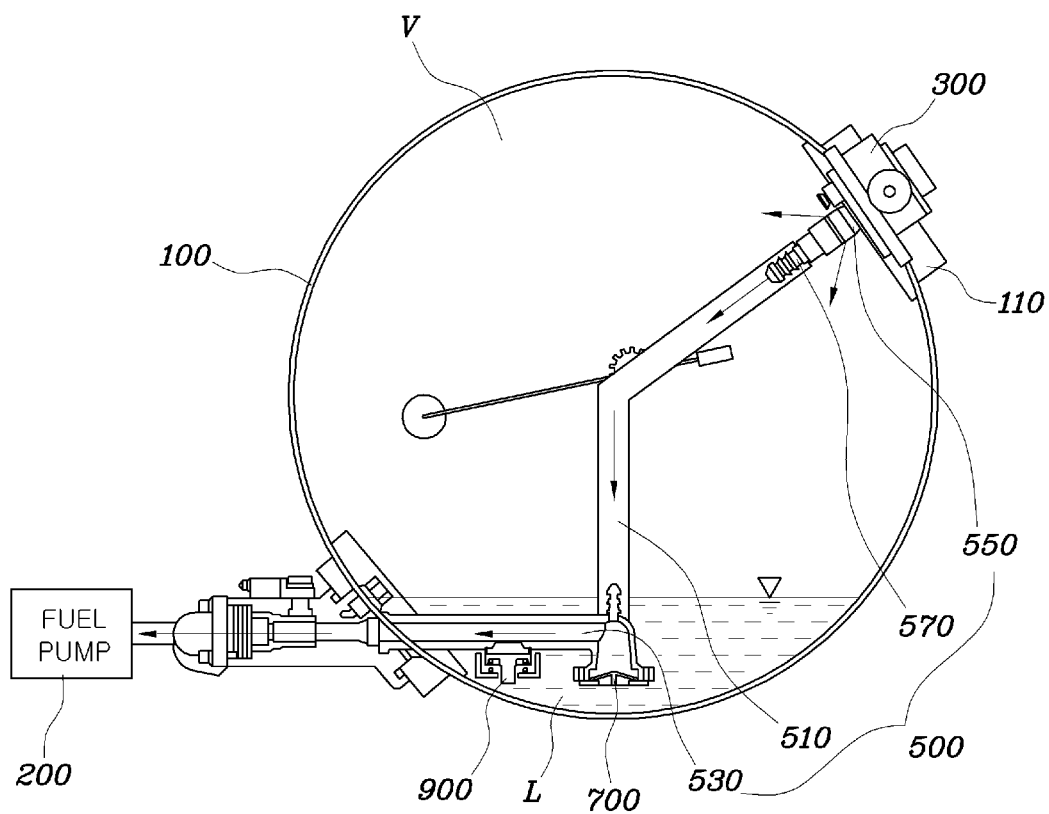
FIG. 4 is a view showing a LPG bomb apparatus when starting a charging according to the present invention.
Figure 5:
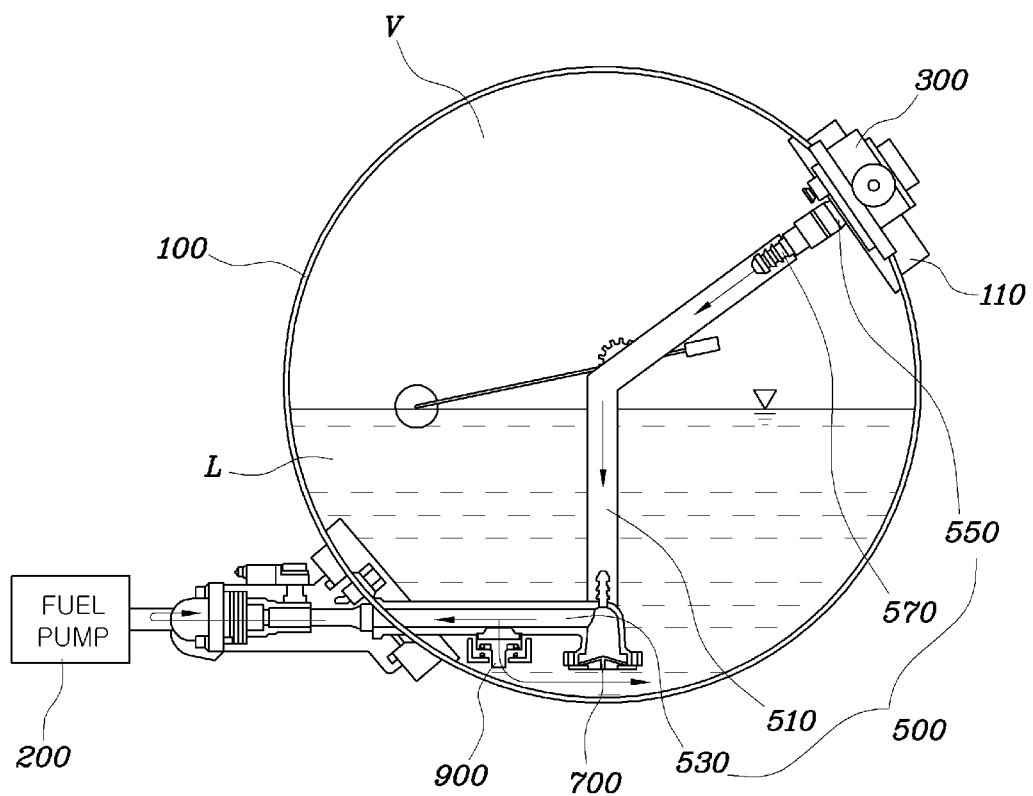
FIG. 5 is a view showing a LPG bomb apparatus during a charging according to the present invention.
Figure 6:
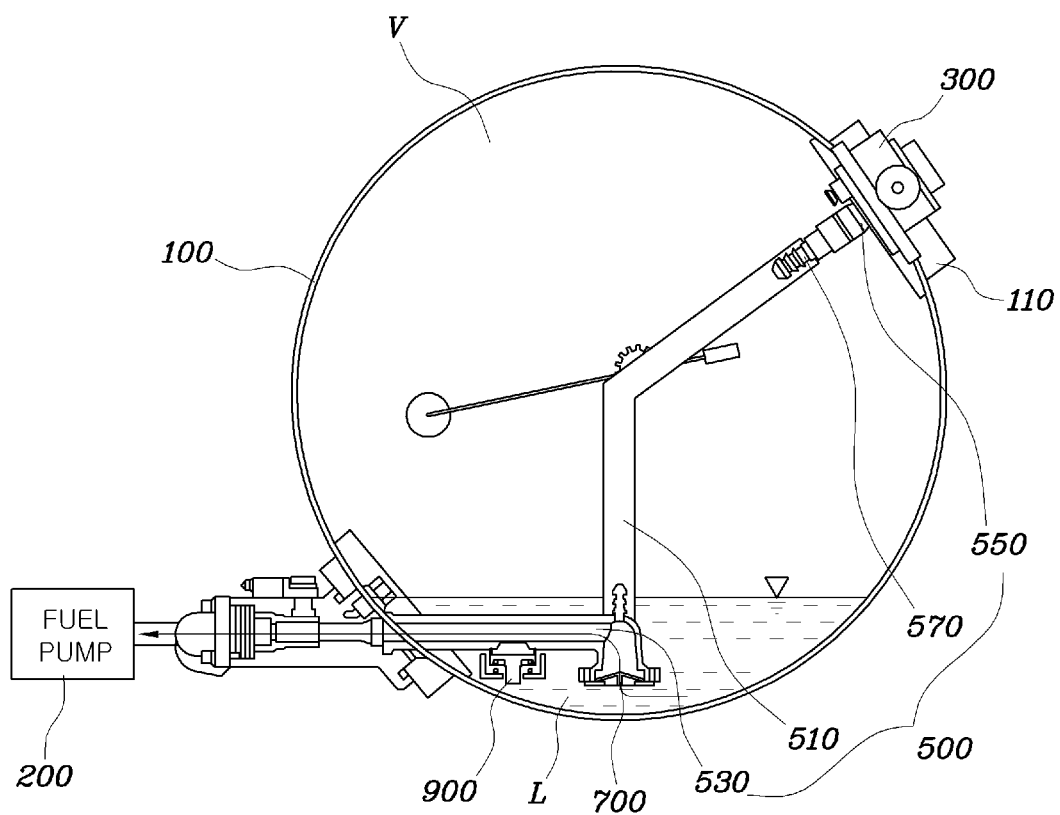
FIG. 6 is a view showing a LPG bomb apparatus during a driving according to the present invention.
Figure 7:
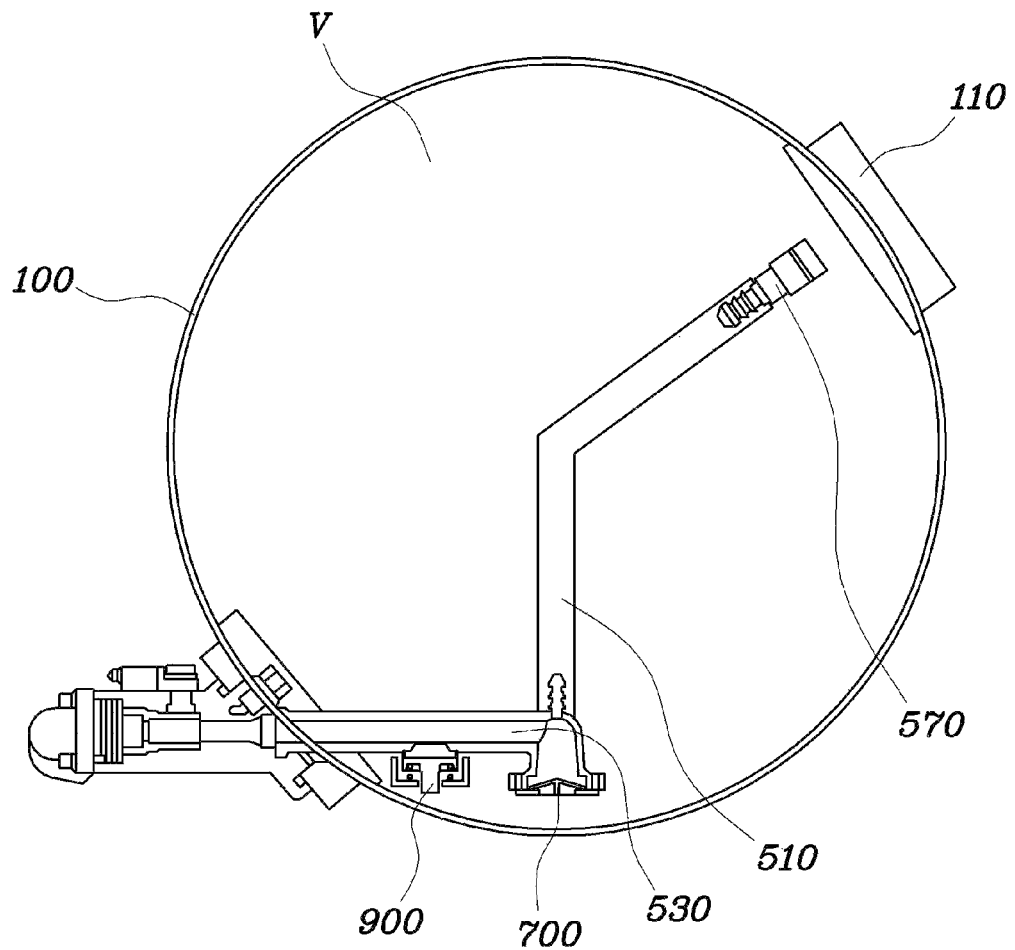
FIG. 7 is a view showing a first assembling step of a LPG bomb apparatus according to the present invention.
Figure 8:
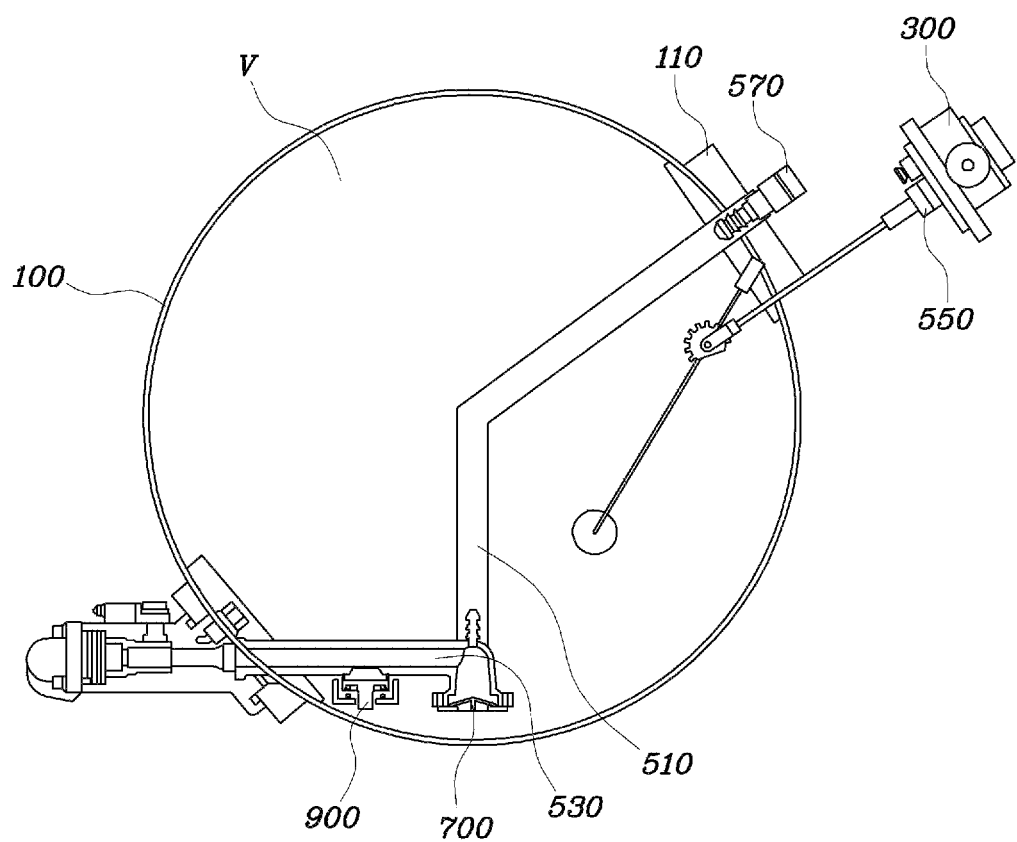
FIG. 8 is a view showing a second assembling step of a LPG bomb apparatus according to the present invention.
Figure 9:
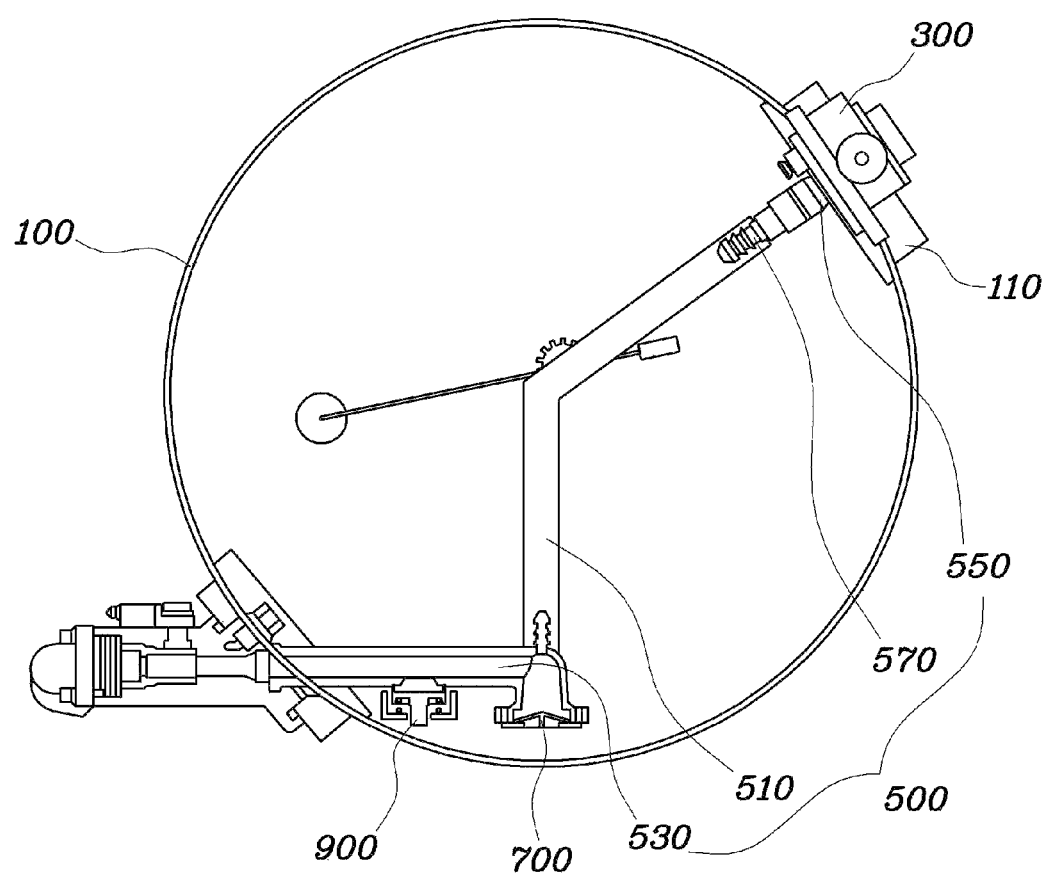
FIG. 9 is a view showing a final assembling step of a LPG bomb apparatus according to the present invention.

FIG. 3 is a view showing a LPG bomb apparatus in accordance with one embodiment of the present invention, FIGS. 4 to 6 are views showing a LPG bomb apparatus during a charging or a driving, and FIGS. 7 to 9 are views showing the assembling steps of a LPG bomb apparatus according to the present invention.

As shown in FIG. 3, a LPG bomb apparatus according to the present invention may include: a fuel charging unit 300 provided on a LPG bomb 100; a fuel conduit 500 through which fuel flows from the fuel charging unit 300 to a fuel pump 200; a first check valve 700 that is formed on the fuel conduit 500 in the LPG bomb 100 and sucks the fuel by a pressure of the fuel pump 200; and a second check valve 900 that is formed on the fuel conduit 500 in the LPG bomb 100, spaced apart from the first check valve 700, and discharges the fuel charged by the fuel charging unit 300 to the LPG bomb 100.

The fuel conduit 500 may include: a liquid-phase charging pipe 510 with an upper end connected to the fuel charging unit 300 and a lower end extended to a bottom of the LPG bomb 100; and a suction conduit 530 connected to the liquid-phase charging pipe 510 to transport the sucked fuel to the fuel pump 200. The liquid-phase charging pipe 510 may be formed of a flexible material, such as a plastic having flexibility and preferably capable of preventing corrosion thereof when charging a fluid fuel.

The first check valve 700 and the second check valve 900 may be formed on the suction conduit 530 of the fuel conduit 500, in particular, on a downstream side of the suction conduit 530, and being spaced apart from each other.

In addition, an injection hole 550 may be formed on the upper end of the fuel conduit 500 to evaporate a part of the fuel and to inject the part of the evaporated fuel to a gas-phase side V of the LPG bomb 100 in accordance with a ratio determined when charging fuel, and the remaining fuel is charged to a liquid-phase side L through the liquid-phase charging pipe 510.

Referring now to FIGS. 4 to 6, FIG. 4 shows the interior of the LPG bomb 100 when starting a charging in which a fuel charged is evaporated and a pressure in the LPG bomb 100 is rapidly decreased while the temperature in the LPG bomb 100 is increased, when a vehicle starts-off in order to charge fuel into the LPG bomb 100. In this case, the pressure before start-up of the vehicle may be maintained even though the pressure in the LPG bomb 100 is lowered at the time of restarting the vehicle, and even after vehicle start-up, heat still remains in the fuel pump 200 to make the pressure in the fuel pump 200 higher than that in the LPG bomb 100, and thus to prevent the fuel from flowing into the fuel pump 200 not to restart the vehicle.

The fuel may flow in the direction of arrows depicted in FIG. 4, when the LPG bomb 100 is charged with the fuel such that the liquefied fuel passes through the fuel conduit 500 to reach the fuel pump 200 via the fuel charging unit 300. At this time, a part of the liquefied fuel may be evaporated through the injection hole 550 to be injected into the gas-phase side V. Generally, the amount of fuel injected to the gas-phase side V and the amount of fuel injected to the liquid-phase side L may be varied depending on a model and/or a state of different vehicles. In one embodiment according to the present invention, a case in which the ratio of the gas-phase to the liquid-phase is 5:95 will be described.

When starting to charge a fuel, a pressure may be generated in the fuel conduit 500 while pressure is not generated in the fuel pump 200, to prevent the fuel being charged from being evaporated by high temperatures in the LPG bomb 100. The temperature, pressure, and composition of the fuel in the LPG bomb preferably is equal to those of the fuel in the fuel conduit 500.

When the fuel is continuously charged in the fuel conduit 500 while it is full of the fuel as depicted by the arrows in FIG. 5, the fuel cannot flow to the fuel pump 200 to continuously produce pressure, and the second check valve 900 capable of discharging the fuel to the liquid-phase side L of the LPG bomb 100 from the suction conduit 530 is opened by the elasticity of the valve to discharge the fuel that flowed into the suction conduit 530 via the liquid-phase charging pipe 510 to the liquid-phase side L.

The second check valve 900 may be opened to charge the liquid-phase side L of the LPG bomb 100 with fuel, when the pressure generated in the fuel conduit 500 in the course of charging exceeds a predetermined pressure. The pressure for opening the second check valve 900 may be set at different levels by design choice, but preferably is set higher than that of the LPG bomb 100.

FIG. 6 shows a flow of fuel during a driving, in which a pressure may be generated in the fuel pump 200 to suck a fuel such that the fuel is sucked to the inside of the suction conduit 530 when the pressure is generated in the fuel pump, and the second check valve may be opened when a pressure higher than the predetermined pressure is applied thereto, but it cannot be opened because a negative-pressure is generated in the suction conduit 530 from the fuel pump 200. Moreover, the second valve preferably has a counter shape.

The first check valve 700 may be opened, and the fuel may be sucked to the suction conduit 530 from the LPG bomb 100 via the first check valve 700. The first check valve preferably has an umbrella shape, and a fuel suction capability thereof is not affected by the pressure that opens the valve.

FIGS. 7 to 9 represent steps for assembling a LPG bomb apparatus according to one embodiment of the present invention. The fuel charging unit 300 and the fuel conduit 500 may be separately assembled to the LPG bomb 100. In the LPG bomb apparatus according to one embodiment, assembly steps of the first check valve 700 and the second check valve 900 are depicted.

FIG. 7 shows a first step for installing the first check valve 700. The first check valve 700 and the second check valve 900 may be formed on the suction conduit 530, and the liquid-phase charging pipe 510 formed by a flexible plastic tube may be pressed into the second check valve 900. Further, as shown in FIG. 7, a quick-connector 570 may be formed on the upper portion of the liquid-phase charging pipe 510 of the fuel conduit 500 to facilitate the assembly of the fuel conduit 500 and the fuel charging unit 300. The quick-connector 570 may set a path of the liquid-phase charging pipe 510 such that it is possible to access to the quick connector for assembling the fuel charging unit 300 through the a fuel charging unit assembling hole 110 formed on the LPG bomb 100.

FIG. 8 shows a second step for installing the fuel charging portion 300. The quick-connector 570 coupled to the liquid-phase charging pipe 510 may be protruded to the outside via the fuel charging unit assembling hole 100. For example, the liquid-phase charging pipe 510 can be protruded outside since it is made of flexible material and some clearance is generated when it is pulled due to its three dimensional path. The quick-connector 570 protruded to the outside and a liquefied fuel discharging part of the fuel charging unit 300 may be coupled with each other, and then the fuel charging unit 300 may be entirely fastened to the fuel charging unit assembling hole 110 of the LPG bomb 100.

FIG. 9 shows the completely assembled LPG bomb apparatus according to one embodiment of the present invention. In the LPG bomb apparatus according to one embodiment of the present invention, the charging of the bomb is completed when the LPG bomb is at the lowest pressure during charging at a high temperature (about 50~58° C.) while the air within the LPG bomb is substantially removed and approximately 20% of the fuel remains in the LPG bomb. According to the present invention, after completing the charging, unlike the prior art, the pressure in the LPG bomb is lowered and a liquefied fuel flows into the suction conduit during the charging, and thus the vehicle can be restarted after charging.

According to the present invention, even though a vehicle restarts after a charging while a vehicle is frequently charged with LPG by small quantities of fuel, the vehicle can be driven under severe conditions such as a low-speed overload state, or the internal temperature of the LPG bomb can be increased in a scorching summer, and the pressure in the LPG bomb will remain higher than the pressure in the suction conduit to transport fuel in the LPG bomb in a normal manner to a fuel motor, thereby improving start-up performance.

While the invention has been described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A Liquefied Petroleum Gas (LPG) storage apparatus comprising:
    a fuel charging unit formed on an LPG container to refill fuel into the LPG container;
    a fuel conduit through which the fuel flows from the fuel charging unit to a fuel pump arranged outside of the LPG container;
    a first check valve that is formed on the fuel conduit inside the LPG container and allows the fuel to flow through the fuel conduit when a pressure is generated in the fuel pump; and
    a second check valve that is formed on the fuel conduit inside the LPG container, is spaced apart from the first check valve, and discharges the fuel to be charged by the fuel charging unit to the LPG container.

2. The LPG storage apparatus according to claim 1, wherein the fuel conduit comprises:
    a liquid-phase charging pipe having an upper end connected to the fuel charging unit and a lower end extended to a bottom of the LPG container; and
    a suction conduit that is connected to the liquid-phase charging pipe and transports the fuel to the fuel pump.

3. The LPG storage apparatus according to claim 2, wherein the liquid-phase charging pipe is made of a flexible material.

4. The LPG storage apparatus according to claim 2, wherein the liquid-phase charging pipe is a plastic tube.

5. The LPG storage apparatus according to claim 2, wherein the first check valve and the second check valve are formed on the suction conduit.

6. The LPG storage apparatus according to claim 5, wherein the first check valve and the second check valve are formed on a downstream side of the suction conduit.

7. The LPG storage apparatus according to claim 1, wherein an injection hole is formed on the upper end of the fuel conduit such that a part of the fuel that flows through the fuel conduit evaporates to a gas phase, in accordance with a ratio determined when charging the fuel, and the evaporated fuel flows to a gas-phase side V of the LPG container.

8. The LPG storage apparatus according to claim 1, wherein the first check valve has an umbrella shape.

9. The LPG storage apparatus according to claim 1, wherein the first check valve is opened while a vehicle is driven and the fuel inflows into the fuel pump therethrough.

10. The LPG storage apparatus according to claim 1, wherein the second check valve is opened to charge a liquid-phase side L of the LPG container with the fuel when a pressure generated in the fuel conduit is a set pressure or more when charging the fuel.

11. The LPG storage apparatus according to claim 1, wherein a quick connector is formed on the upper end of the fuel conduit to facilitate assembly of the fuel conduit and the fuel charging unit.

* * * * *